United States Patent [19]
Topkaya et al.

[11] Patent Number: 5,332,881
[45] Date of Patent: Jul. 26, 1994

[54] TOOL HEAD WITH AN AUTOMATICALLY ADJUSTABLE OPTICAL FOCUSING SYSTEM

[75] Inventors: Ahmet Topkaya, Karlsruhe; Josef Illik, Gaggenau; Jörn Steinhauer, Karlsruhe; Jürgen Walz, Baden-Baden; Jürgen Volpel, Gernsbach, all of Fed. Rep. of Germany

[73] Assignee: Weidmüller Interface GmbH & Company, Detmold, Fed. Rep. of Germany

[21] Appl. No.: 937,742

[22] Filed: Sep. 1, 1992

[30] Foreign Application Priority Data

Sep. 3, 1991 [DE] Fed. Rep. of Germany ....... 4129278

[51] Int. Cl.$^5$ ............................................. B23K 26/06
[52] U.S. Cl. ............................ 219/121.75; 219/121.78; 219/121.84
[58] Field of Search ................... 219/121.83, 121.84, 219/121.75, 121.78, 121.79, 121.82

[56] References Cited

U.S. PATENT DOCUMENTS

| | | | |
|---|---|---|---|
| 5,063,280 | 11/1991 | Inagawa et al. | 219/121.7 |
| 5,118,918 | 1/1992 | Serrano | 219/121.78 |

FOREIGN PATENT DOCUMENTS

| | | |
|---|---|---|
| 3816773 | 12/1988 | Fed. Rep. of Germany . |
| 0306456 | 3/1989 | Fed. Rep. of Germany . |
| 5667413 | 10/1988 | Switzerland . |

*Primary Examiner*—C. L. Albritton

[57] ABSTRACT

The invention relates to a tool head for machining a workpiece by means of a laser beam (10), which passes through an optical focusing system (2) which is disposed within the tool head and which is carried by a lens mounting (3) and which can be positioned only by displacing the lens mounting (3) relative to the tool head in the direction of the laser beam. The lens mounting (3) is displaced using automatic setting means (8, 9; 23).

24 Claims, 3 Drawing Sheets

TOOL HEAD WITH AN AUTOMATICALLY ADJUSTABLE OPTICAL FOCUSING SYSTEM

The invention relates to a tool head according to the preamble of patent claim 1, for the machining of a workpiece by means of a laser beam which passes through an optical focusing system which is disposed within the tool head, is carried by a lens mounting and which can be positioned only by displacement of the lens mounting relative to the tool head in the direction of the laser beam.

BACKGROUND OF THE INVENTION

In the machining of a workpiece by means of a laser beam, for example in the cutting of the workpiece by means of a high-power laser beam, the position of the focal point of the optical focusing system relative to the workpiece surface is of great importance.

When using a conventional laser tool, in order to set or to maintain constant the spacing between the tool head or the focal point of the optical focusing system and the workpiece, a sensor electrode is fitted to the tool head, which sensor electrode measures the actual spacing between the tool head and the workpiece surface, for example using capacitance. The signal obtained from the sensor electrode is passed to a regulating device which compares the measured actual spacing with a theoretical spacing and balances a corresponding difference by suitable drive of a drive motor connected to the tool head. In this way, a desired spacing between tool head and workpiece surface can be maintained independently of the course of the workpiece surface. This also means that during the machining of the workpiece the spacing between the focal point of the optical focusing system and the workpiece surface no longer changes.

However, the aforementioned drive motor must move the entire tool head, which, on its part, is mounted on a supporting arm. Accordingly, the laser tool has relatively great inertia, since, on account of the high mass of the tool head, it cannot react very rapidly to changes of spacing between tool head and workpiece surface. Thus, the laser tool exhibits only a low working speed.

In the case of the conventional tool head, the optical focusing system and the lens mounting cannot be adjusted during the operation of the tool head. For this purpose, it would be necessary to act manually on the tool head; this being virtually impossible during the operation thereof. Only before the operation of the tool head can the optical focusing system be adjusted via the lens mounting in the direction of the laser beam, for which purpose a setting ring is situated at the external surface of the tool head, which setting ring appropriately displaces the lens mounting upon rotation.

EP 0,306,456 A1 discloses a further tool head in the case of which the optical focusing system for the laser beam is disposed within a nozzle. However, the optical focusing system and the nozzle are fixedly connected to one another. Accordingly, in order to regulate the spacing between tool head and workpiece surface by means of a sensor electrode, the nozzle, the optical focusing system and a cylindrical coil carrier with an externally applied coil are displaced in relation to a magnet, so that a laser tool exhibiting this tool head also has relatively great inertia, in consequence of the large masses which are to be displaced.

SUMMARY OF THE INVENTION

The object of the invention is to provide a tool head of the initially mentioned type in which a positioning of the focal point of the optical focusing system relative to the workpiece surface is possible, even during operation, just by displacement of the lens mounting.

The manner of achievement of the set object is indicated in the defining clause of patent claim 1. Advantageous further developments of the invention can be inferred from the subclaims.

A tool head according to the invention for the machining of a workpiece by means of a laser beam which passes through an optical focusing system which is disposed within the tool head, is carried by a lens mounting and can be positioned only by displacement of the lens mounting relative to the tool head in the direction of the laser beam is defined in that the lens mounting is displaceable using automatic setting means.

The optical focusing system and the lens mounting exhibit only a very small mass, which may be displaced rapidly and simply without a significant inertia effect, so that a laser tool equipped with this tool head possesses a high working speed. Moreover, on account of the small mass to be displaced, the drive device can be designed to have a relatively low power; this has a favorable effect, in terms of cost, on the production price of the tool head.

The tool head according to the invention may be employed for a multiplicity of special tasks, for example for puncturing an aperture in the workpiece prior to commencement of a cutting process. In the course of the puncturing, the focal point of the optical focusing system must, in general, be situated at a greater distance from the workpiece than in the course of the subsequent laser cutting. Accordingly, the entire tool head had formerly to be brought to a greater distance during the puncturing. Now, just an appropriate displacement of the lens mounting or optical focusing system during the puncturing is sufficient, this taking place relatively rapidly. Furthermore, in the case of the drilling of the workpiece by means of the laser beam a simplification is achieved. Especially in the case of thick workpieces, a continuous displacement of the focal point in the direction of the beam is advantageous during the drilling. To this end, the entire tool head now no longer needs to be moved toward the workpiece: it is sufficient to displace only the lens mounting and, together with it, the optical focusing system in the direction of the laser beam. Likewise, it is possible to react very rapidly to a change of workpiece material or of workpiece thickness, which in general requires an adaptation of the position of the focal point, since the mass which is to be moved for the displacement of the focal point is only very small. In the case of the automatic lens adjustment according to the invention, a principal advantage does however also reside in the possibility of specifying by means of the control system a focusing position without any change in the spacing between tool head and workpiece.

The displacement of the lens mounting or of the optical focusing system which is connected to it can take place, for example, as a function of a stored program which is situated in a control unit of the laser tool. The position of the focal point can also be specified by this control unit. In order to permit an absolute measurement of the path, a path pickup is preferably connected to the lens mounting, which path pickup serves for the measurement of the position of the lens mounting or of the optical focusing system relative to the tool head. Where the position of the tool head relative to the workpiece is measured by means of a sensor device situated on the tool head, the position of the lens mounting or of the optical focusing system relative to the workpiece may be determined overall and thus also the position of the focal point of the optical focusing system relative to the workpiece. By means of an appropriate regulating unit, the instantaneous position of the focal point can be compared with a desired or theoretical position and can be appropriately reregulated, in the event that a deviation is present. By this means, a continuous guiding of the focal point of the optical focusing system at a specified spacing relative to the workpiece is possible.

There are tool heads used with a process gas environment, which is required for the cutting of the workpiece. On the other hand this process gas is also employed to cool and clean the optical focusing system. If pressure fluctuations occur in the process gas, then this may however in certain circumstances lead to a readjustment or misadjustment of the optical focusing system. In the tool head according to the invention, such pressure fluctuations are non-problematic, since a change of position of the optical focusing system caused thereby can immediately be compensated again if, as mentioned, the tool head is equipped with a path pickup. However, pressure fluctuations can also be brought about intentionally, for example as a function of the machining process to be carried out in each instance. In this case also, the optical focusing system may be positioned in the desired manner independently of the respective process gas pressure, so that its focal point can adopt a predetermined theoretical position relative to the workpiece surface.

According to an advantageous refinement of the invention, the means for the adjustment or displacement of the lens mounting are pneumatic setting means, hydraulic setting means and/or electrical, electric-motor or piezoelectric setting means. They can in each instance be employed alone or else in combination with one another. The displacement of the lens mounting by pneumatic means has the advantage that an already present process gas for the machining of the workpiece can also be utilized for the adjustment. Accordingly, such setting means may be constructed very economically. The advantage of a very precise setting is achieved by hydraulic and electrical or electric-motor setting means, this leading to even more precise machining processes. However, the electrical setting means are in general of relatively low power, so that balancing measures must be implemented in the event that too great a pressure difference exists between the front surface and the rear surface of the lens mounting or optical focusing system.

According to a very advantageous further development of the invention, a space is subdivided by the lens mounting into two pressure chambers which are situated in front of and behind it in the direction of the laser beam, it being possible for the pressure chambers to be filled in each instance with a fluid for the displacement of the lens mounting. By setting differing fluid pressures in the respective pressure chambers, it is thus possible to displace the lens mounting and, together with it, the optical focusing system in a simple manner and very rapidly. The fluid may be a liquid or a gas, for example the already mentioned process gas (cutting gas).

By way of example, the process gas employed for the machining of the workpiece can be introduced at least into the pressure chamber situated on the beam exit side. It acts on the lens mounting so that the optical focusing system moves away from the workpiece surface. Into the pressure chamber situated on the beam entrance side it is then possible to introduce a separate control gas, the pressure of which can be set by means of a regulating valve so that it is greater or less than that of the process gas in the pressure chamber situated on the beam exit side. By driving the regulating valve, it is thus possible to displace the lens mounting, together with the optical focusing system, so that the focal point of the optical focusing system can adopt a desired position relative to the workpiece.

However, the process gas and control gas do not need to be different from one another in all cases. It is usually possible to employ compressed air as control gas. However, it is also possible to derive the control gas from the process gas; in this case, the process gas fed to the pressure chamber situated on the beam exit side exhibits a lower pressure than the process gas fed to the valve. In this case, the pressure chamber situated on the beam exit side would be connected, on the entrance side, with a pressure-reducing valve.

As described, the lens mounting can be displaced by setting a pressure difference between the pressure chamber situated on the beam entrance side and that situated on the beam exit side. However, the two pressure chambers can also be subjected to the same gas pressure, so that now a displacement of the lens mounting is possible using an electric-motor drive. Such a solution enters into consideration if the process gas is already contained in the pressure chamber situated on the beam exit side anyway, but the intention is to dispense with control of the control gas by means of the pressure valve. Since the same pressure then prevails in both pressure chambers, a displacement of the lens mounting can be undertaken relatively simply by means of the electric-motor drive, so that a highly precise setting of the focal point is possible. However, a disadvantage is that, as a result of the electric motor and possibly a gear, moving masses additionally come into play, so that, as a result of this, the response behavior of the adjustment device is further delayed.

Of course, it is possible to choose those surfaces of the lens mounting which are subjected to pressure to be of differing size for the respective pressure chambers, in order in this manner to take account of existing gas pressures. It is also possible for the lens mounting to be displaced against the force of a spring disposed on the beam exit side, this being advantageous especially in circumstances in which no cutting gas pressure builds up in the pressure chamber situated on the beam exit side. In this case, now just as previously, a positioning of the focal point may be undertaken by pressure setting in the pressure chamber situated on the beam entrance side.

It is possible, without further complication, to guide the gas situated in the pressure chamber situated on the beam exit side and the gas situated in the pressure chamber situated on the beam entrance side toward the respective side of the optical focusing system. By this means, the optical focusing system may be cooled and, at the same time, cleaned.

The optical focusing system itself may for example consist of a single lens or of a lens system.

According to an advantageous further refinement of the invention, the lens mounting can be adjusted only by means of an electric motor. Adjustment by means of a piezoelectric drive is also possible. In this case, the pressure difference between the front surface and the rear surface of the optical focusing system or lens mounting must not however be excessively great.

If, now just as previously, the process gas is conducted through that space of the tool head which is situated on the beam exit side, which thus adjoins the beam exit side of the optical focusing system, then in the case of an electric-motor or piezoelectric drive mode, a protective glass is disposed on the beam exit side and at a distance from the optical focusing system, in order to seal off the space provided for the optical focusing system and the lens mounting from the space provided for the process gas. In this way, the pressure difference on both sides of the optical focusing system may be reduced or matched to one another, so that the lens mounting can be adjusted without further complication by means of the electric-motor or piezoelectric drive.

According to a further advantageous refinement of the invention, mechanically settable abutments for the lens mounting are provided for the setting of theoretical positions. The abutments can be displaced in the desired manner in the direction of the laser beam, in order to limit the range of movement of the lens mounting on both sides in the direction of the laser beam. The displacement of the abutments takes place manually. During the machining of the workpiece, the lens mounting can thus be guided very rapidly toward one or other of these abutments, in order thus to be able to adopt a predetermined theoretical position rapidly. In the case of the two pressure chambers, for example, the pressure chamber situated on the beam entrance side can suddenly be subjected to very high pressure or ventilated, so that one of the two set theoretical positions may selectively be run up. Where only these two theoretical positions are to be capable of being adopted, then the electrical regulating unit, the path pickup and the pressure regulating valve do not need to be present. Of course, the lens mounting may also at the same time be positioned by the mechanically settable abutments, and specifically manually if this is desired.

The abutments may also be provided with arresting devices to arrest the lens mounting. After arresting of the lens mounting, no further automatic displacement is possible.

It has proved to be very advantageous to provide, in the region of a seal between walls which can be moved in relation to one another, a friction-reducing surface coating on the sealing element and/or on the opposite wall region, since in this manner the forces for the displacement of the lens mounting or of the optical focusing device may further be reduced. If, by way of example, sealing rings are employed as sealing elements, then their surface can be solid-brominated or carbon-coated. It is also possible to provide a PTFE coating (coating of polytetrafluoroethylene) on sliding surfaces which are in contact with one another.

The path pickup employed may be an inductive, capacitive, potentiometric or optical path pickup. However, it may preferably also comprise an LVDT path pickup, i.e. a Linear Variable Difference Transformer. This consists of a hollow metal cylinder with three integrated coils. The central one serves as the primary circuit, while two identical coils at the sides function as secondary windings. These are connected in series, but in opposite senses. At the center of the pickup, a ferromagnetic core moves freely and transmits the magnetic field generated in the primary coil by an alternating voltage to the two secondary windings. The magnitude and direction of the current induced in the secondary windings is, in this case, dependent upon the position of the core. If the core is situated at the center of its stroke, the amplitudes of the two secondary sinusoidal oscillations are of approximately equal magnitude, but phase-shifted by 180°. If the core is moved in one or the other direction, then a difference voltage is formed which is directly proportional to the core position. In this case, the phase of the output signal jumps through 180° on passing through zero. A downstream electronic system converts the alternating voltages of the two secondary coils into an analog output voltage. Using two potentiometers, the amplification and the offset voltage can be varied.

BRIEF DESCRIPTION OF THE DRAWINGS

The invention is described in greater detail hereinbelow with reference to the drawing. In the drawings.

DETAILED DESCRIPTION OF THE EMBODIMENTS

Figure 1:
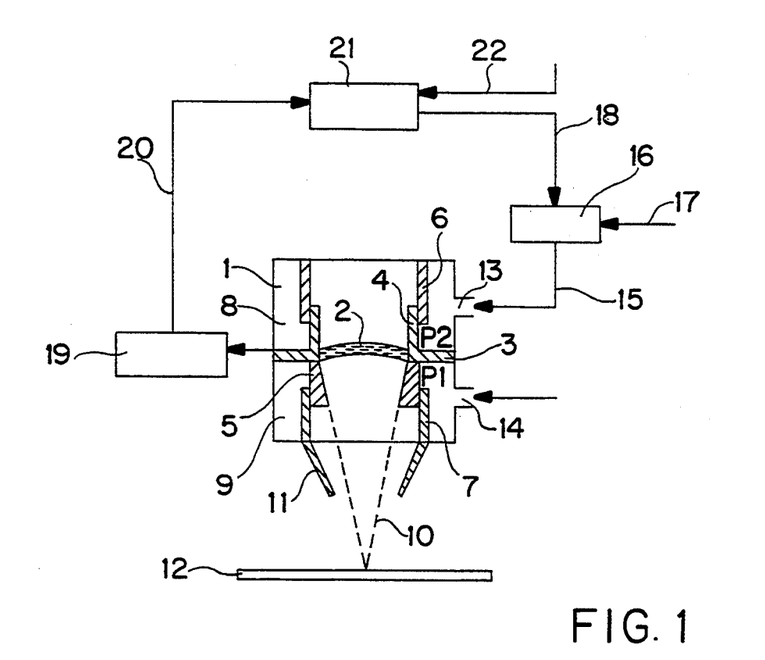
FIG. 1 shows the basic structure of a tool head allowing pneumatic setting of the lens mounting.

FIG. 1 shows the basic structure of a tool head according to the invention allowing pneumatic adjustment of the lens mounting.

In a tool head housing 1 there is situated an optical focusing system 2, for example a single lens or a lens system, which is mounted in a lens holder 3. The lens holder 3 is of annular design and its outer peripheral edge rests against the inner wall of the tool head housing 1, which is designed to be hollow-cylindrical. Sealing elements between the outer edge of the lens holder 3 and the inner wall of the tool head housing 1 are not shown, for the sake of clarity. Guide cylinders 4 and 5 are fixed to the lens holder 3 at its upper and lower side, which guide cylinders concentrically surround the optical focusing system 2. By their outer peripheral surfaces, the guide cylinders 4 and 5 lie fittingly in receiving cylinders 6 and 7 respectively, which are disposed in the interior of the tool head housing 1 concentrically with the latter and are secured thereto. Overall, therefore, the optical focusing system 2 and the lens holder 3 are slidingly displaceable by means of the guide cylinders 4 and 5 in the receiving cylinders 6 and 7, and specifically in the cylinder longitudinal direction of the tool head housing 1.

The annular space between the outer walls of the receiving cylinders 6 and 7 and the inner wall of the tool head housing 1, which is designed to be of cylindrical shape, is horizontally subdivided by the lens holder 3 into two pressure chambers, and specifically into a pressure chamber 8 which is situated on the beam entrance side and into a pressure chamber 9 which is situated on the beam exit side, which pressure chambers are closed off at the respective end faces of the tool head housing 1. On the other hand, the tool head housing 1 is open at the end face in the interior of the receiving cylinders 6 and 7, in order to permit the passage of a laser beam 10. A nozzle 11 adjoins the receiving cylinder 7 situated on the beam exit side in the direction of the laser beam. The laser beam 10 impinges upon a workpiece 12 to be processed, which is situated opposite the tip of the nozzle 11.

The two pressure chambers 8 and 9 are hermetically sealed per se, for example by suitable seals (not shown), and exhibit in each instance an entrance 13, 14. Via the entrance 14, the pressure chamber 9 situated on the beam exit side is supplied with a process gas, which is employed, for example, in the machining of the workpiece 12. As will be described hereinbelow, this process gas can be conducted into the interior of the guide cylinder 5 and toward the optical focusing system 2, in order to clean and to cool the latter before it passes out from the tip region of the nozzle 11 and acts upon the workpiece 12. The appropriate openings are not shown in the guide cylinder 5 of FIG. 1, for the sake of clarity. On the other hand, the entrance 13 of the pressure chamber 8 situated on the beam entrance side is connected via a pressure line 15 with the exit of a proportional pressure valve 16. The proportional pressure valve 16 receives a control gas via a pressure entrance line 17 and an electrical actuating signal via an electrical control line 18. The function of the proportional pressure valve 16 is to convert the electrical actuating signal into a corresponding proportional pressure signal.

Furthermore, a path pickup 19 is connected with the lens mounting 3, which path pickup serves to record the actual value of the position of the focal point of the optical focusing system 2 relative to the tool head housing 1. The path pickup 19 may, for example, be an LVDT pickup (Linear Variable Difference Transformer), which exhibits a high resolution and a good reproducibility. An electrical output signal generated by the path pickup 19 is transmitted via a line 20 to a regulating unit 21. This regulating unit 21 receives, via an electrical line 22, a specified theoretical value with respect to the position of the focal point of the optical focusing system 2 relative to the tool head housing 1 and consequently drives the proportional pressure valve 16 so that the lens mounting 3 is appropriately displaced, in order to match the actual value to the theoretical value. In this case, the aforementioned specified theoretical value already takes into account the distance of the tool head housing 1 from the workpiece 12, which, to this end, has previously been measured by means of a sensor (not shown), for example a capacitive sensor, which is situated at the tip of the nozzle 11.

In the present case, the optical focusing system 2 and the lens holder 3 respectively are displaced by pneumatic means, in order to bring the focal point into the theoretical position. Pneumatic displacement has the advantage that the gas pressure of the process gas can also be utilized for the adjustment of the optical focusing system. As has already been mentioned, the process gas pressure P1 which is dependent upon the working process prevails in the lower pressure chamber 9. On the other hand, a control gas counterpressure P2 which can be set by means of the proportional pressure valve 16 acts in the upper chamber. This counterpressure P2 can be derived, subject to certain restrictions, from the process gas pressure P1, or can be fed from a separate pressure generator via the pressure entrance line 17.

If now a change in the position of the focal point of the optical focusing system 2 becomes necessary as a result of the specified theoretical value for the regulating unit 21, then this can be achieved by changing the pressure P2. If the pressure P2 is smaller than the pressure P1, then the optical focusing system 2 is moved upwards in FIG. 1, i.e. opposite to the direction of propagation of the laser beam 10, and specifically until such time as the theoretical position has been reached. In this case, P2=P1 is then applicable. In this case, the pressure difference determines the speed of movement of the optical focusing system 2. On the other hand, if P2>P1, then the optical focusing system 2 is moved downwards, until the appropriate theoretical position of the focal point has been adopted. As has already been mentioned, the setting of the counterpressure P2 takes place by means of the regulating unit 21, via the proportional pressure valve 16.

Figure 2:
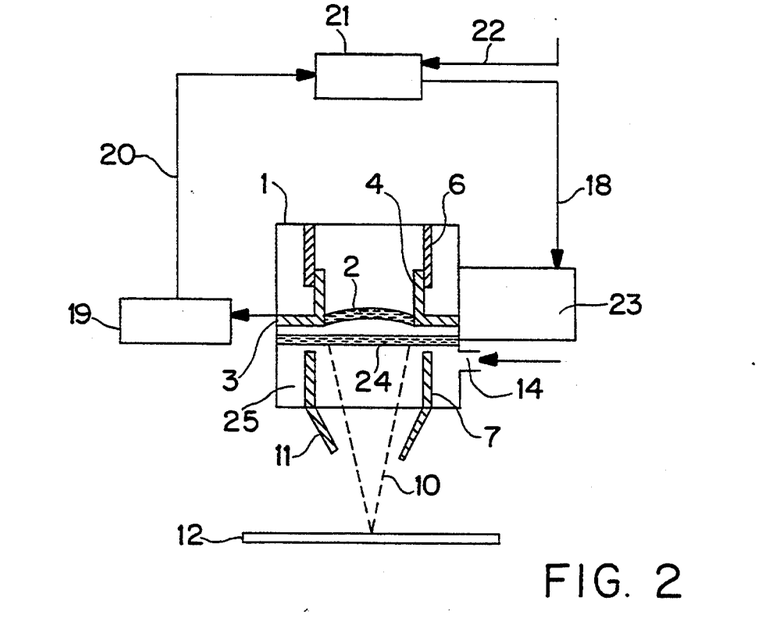
FIG. 2 shows the basic structure of a tool head allowing electric-motor setting of the lens mounting.

A further illustrative embodiment of a tool head according to the invention is shown in FIG. 2. In this case, the same elements as in FIG. 1 are provided with the same reference symbols and are not described again.

In accordance with FIG. 2, the guide cylinder 5 shown in FIG. 1 is not present at that surface of the lens holder 3 which is situated on the beam exit side. Thus, the lens holder 3 is guided only via the guide cylinder 4 within the receiving cylinder 6. On the other hand, the lens holder 3 is connected not only with the path pickup 19 but also with an adjusting motor 23, which receives the electrical actuating signal from the regulating unit 21 via the electrical control line 18.

A protective glass 24 is disposed on the beam exit side at a distance below the optical focusing system 2 or the lens mounting 3, which protective glass subdivides the interior of the tool head housing 1 into two halves. The connection between protective glass 24 and the internal wall of the tool head housing 1 is designed to be gastight. The position of the protective glass 24 within the tool head housing 1 is selected so that the lens holder 3 or the optical focusing system 2 can execute the full axial stroke to match the actual position of the focal point of the optical focusing system 2 to a predetermined theoretical value, and specifically by means of the adjusting motor 23. That space 25 of the tool head housing 1 which is situated below the protective glass 24 is supplied with the process gas, and specifically via the entrance 14. This process gas flows via the end face of the receiving cylinder 7 into the interior of the nozzle 11 as well as in the direction of the workpiece 12. In the present case, the receiving cylinder 7 can also be omitted. It is important that the process gas does not pass to the other side of the protective glass 24, where the lens holder 3 and the optical focusing system 2 are situated. Thus, the process gas pressure does not influence the adjustment of the lens holder 3 by means of the adjusting motor 23, so that therefore the adjusting motor 23 does not have to act against the process gas pressure in the course of the movement of the lens holder 3. Thus, the adjusting motor 23 can be designed to have a relatively low power.

In place of the adjusting motor 23, it is also possible to employ a piezoelectric device. In other respects, the setting of the position of the focal point of the optical focusing system 2 takes place in accordance with the same principle of regulation which has already been described under FIG. 1.

Figure 3:
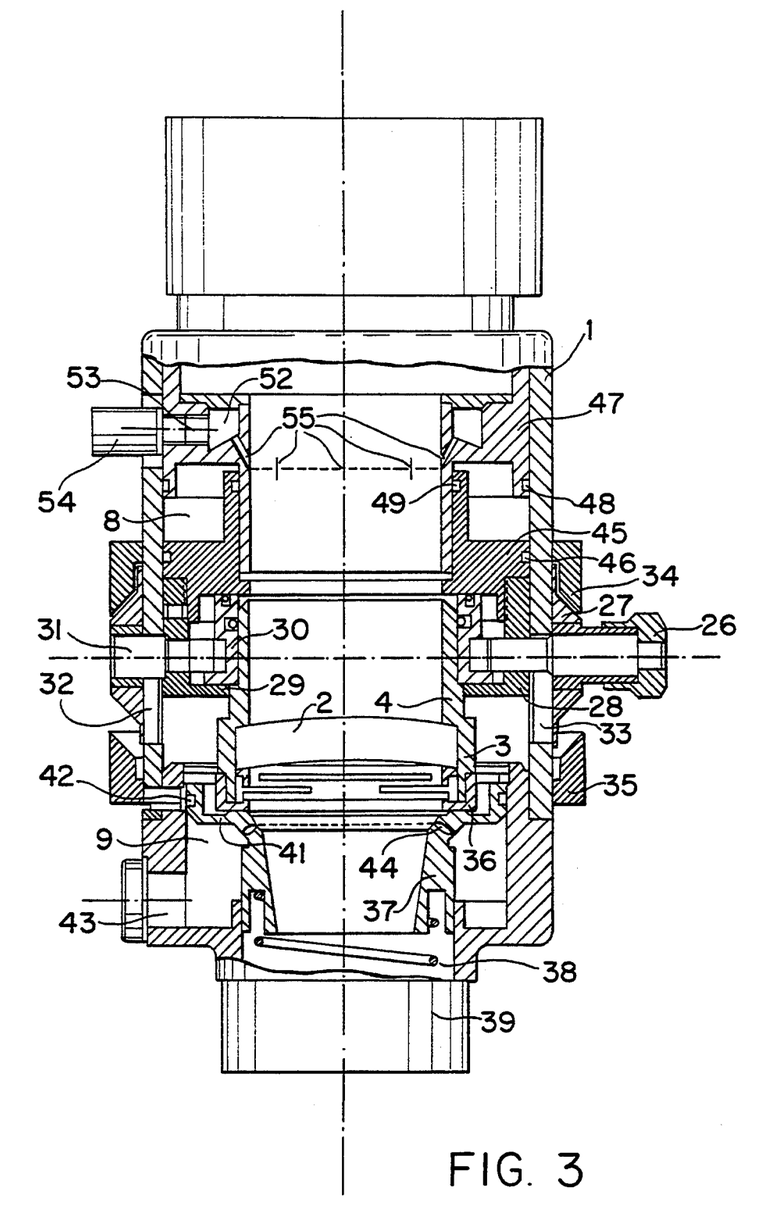
FIG. 3 shows an axial cross-section through an illustrative embodiment of a tool head allowing pneumatic setting of the lens mounting.
Figure 4:
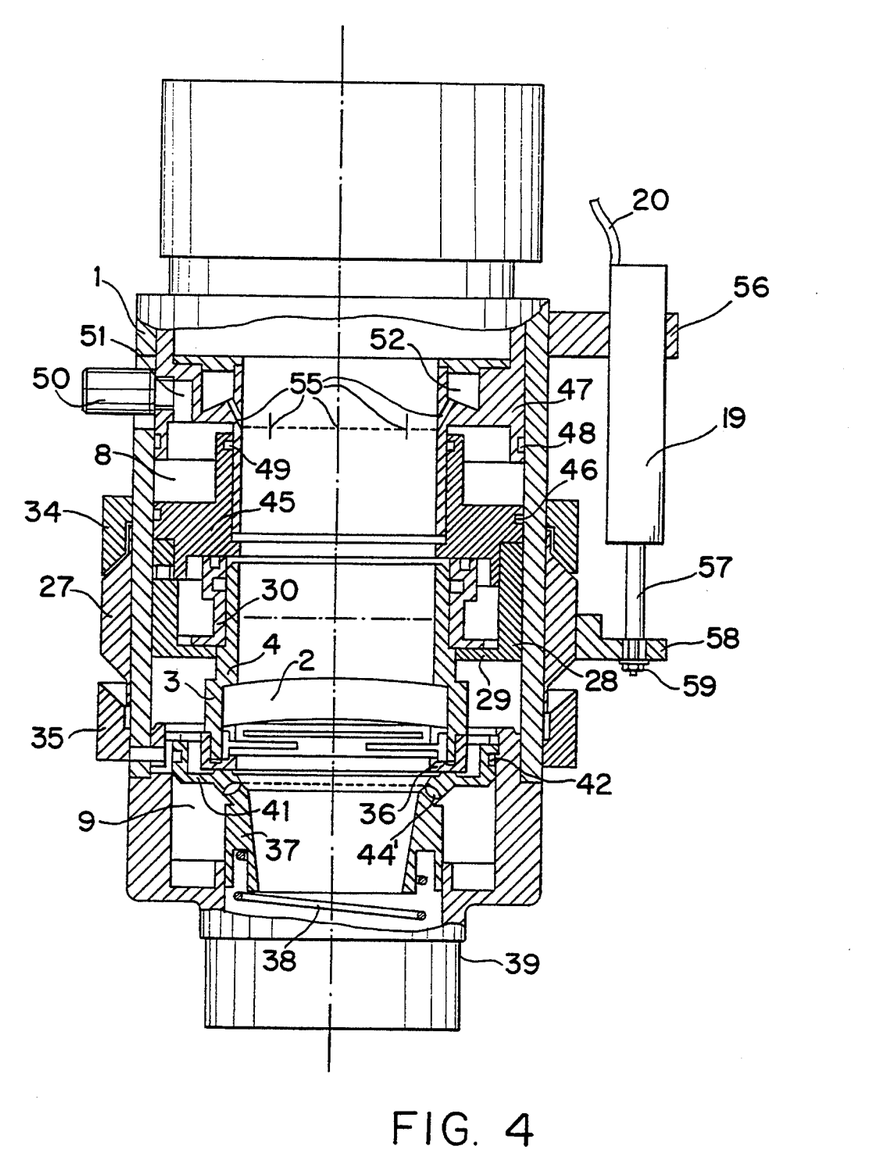
FIG. 4 shows a further axial cross-section through the illustrative embodiment according to FIG. 3.

FIGS. 3 and 4 show the actual construction of a tool head allowing the pneumatic adjustment of lens holder and optical focusing system. In this case, the same elements as in FIGS. 1 and 2 are provided with the same reference symbols.

In accordance with FIGS. 3 and 4, an optical focusing system 2 is mounted in a lens holder 3. On the beam entrance side, the lens holder 3 is integrally connected with a guide cylinder 4; in this case, the two are coaxial with one another. The lens holder 3 and the guide cylinder 4 are disposed coaxially in the interior of a tool head housing. By means of two adjusting screws 26 which are disposed so as to be offset relative to one another by 90° in the peripheral direction of the tool head housing 1, the lens holder 3 can be displaced in radial directions which are perpendicular to one another, in order to be able to adjust the optical lens system 2 in a desired manner in a plane which is perpendicular to the axial direction of the tool head housing 1. In this case, the adjusting screws 26 are rotatably mounted in a carrier ring 27; in this arrangement, they can be screwed into a cup-shaped carrier 28 in the interior of the tool head housing 1. The cup-shaped carrier 28 exhibits a concentric passage opening 29, through which the guide cylinder 4 projects. In this case, the passage opening 29 is larger than the external diameter of the guide cylinder 4. The guide cylinder 4 is slidingly mounted on the base wall of the cup-shaped carrier 28 by means of a projection 30; in this case, the adjusting screws 26 can be guided toward the projection 30. The projection 30 is likewise designed to be annular and is situated concentrically with the guide cylinder 4. A pressure element 31 is situated opposite each adjusting screw 26, in order to hold the guide cylinder 4 via the projection 30 without play in the radial direction. Thus, upon rotation of an adjusting screw 26 the guide cylinder 4 is displaced via the annular projection 30 in the radial direction of the tool head housing 1, and specifically against the force of the pressure element 31; in this case, the projection 30 slides on the inner wall of the cup-shaped carrier 28. The passage opening 29 is selected to be of such a size that sufficient space for the displacement of the guide cylinder 4 is present. The pressure element 31 is also secured in the carrier ring 27.

Respective longitudinal slots 32, 33 are situated in the tool head housing 1 at opposite sides, which slots serve to receive the pressure element 31 and the adjusting screw 26. Projection 31 and adjusting screw 26 may be displaced in the axial direction of the tool head housing within these longitudinal slots 32, 33. In the course of the displacement, the carrier ring 27 is also moved at the same time. Thus, when the carrier ring 27 is moved in the axial direction of the tool head housing 1, the optical focusing system 2 is correspondingly entrained, and specifically via the lens holder 3, the guide cylinder 4, the annular projection 30 and the adjusting screw 26 or the pressure element 31. In order to be able to limit the possible movement of the optical focusing system or of the adjusting screw 26 and of the pressure element 31 in the axial direction of the tool head housing 1, two annular abutments 34, 35 are present at the outer peripheral wall of the tool head housing 1. These annular abutments 34, 35 are, for example, threaded rings, which are screwed onto a corresponding external thread on the outer surface of the tool head housing 1. By rotation of the annular abutments 34, 35, these can be positioned relative to one another so that only a specified room for movement is still available for the elements 26 and 31 in the axial direction of the tool head housing 1. Thus, the annular abutments 34, 35 can be employed for the purpose of establishing specified theoretical positions for the carrier ring 27 and thus for the optical focusing system 2.

The lens holder 3 is situated on the beam exit side in an angular ring seating 36, by means of which it slides on a nozzle-shaped body 37. The nozzle-shaped body 37 is pressed by a compression spring 38 in the direction of the lens holder 3, the compression spring 38 being supported on a front housing part 39 which is releasably connected with the front end face of the tool head housing 1, i.e. that end face of the tool head housing 1 which is situated on the beam exit side. The front housing part 39 exhibits a concentric passage opening for the beam exit. By a rim-type projection 41 at the upper end of the nozzle body 37, the latter engages over the angular ring seating 36, and specifically in such a manner that the latter can still be displaced in the radial direction within the rim-type projection 41 when the optical lens system 2 is moved in the radial direction by means of the adjusting screw 26. The rim-type projection 41 rests against the inner wall of the front housing part 39, a sealing ring 42 being present in this region. Accordingly, a pressure chamber 9 which is situated on the beam exit side is formed by the rim-type projection 41, the nozzle body 37 and the front housing part 39, into which pressure chamber a process gas can be introduced via an opening 43. The process gas can be conducted via passage openings 44 in the nozzle body 37 from the pressure chamber 9 into the interior of the nozzle body 37; in this case, the gas subsequently flows out through the passage opening 40 in the direction of a workpiece (not shown). The passage openings 44 in the nozzle body 37 are aligned so that the process gas flows in the first instance, after leaving the pressure chamber 9, in the direction of the optical focusing system 2, in order to cool and to clean the latter.

It should further be pointed out that that inner wall of the front housing part 39 which is situated opposite the nozzle body 37 extends cylindrically, so that upon displacement of the optical focusing system 2 in the axial direction the sealing ring 42 can slide along this cylindrical inner wall.

As has already been mentioned, the front housing part 39 can be removed from the tool head housing 1, so that the optical focusing system 2 is then exposed. Accordingly, it may easily be exchanged. To do this, it merely needs to be taken out from the lens mounting 3 forwards or in the beam direction.

Above the optical focusing system 2, i.e. on the beam entrance side, a ring element 45 is present, which is releasably connected with the Upper edge of the cup-shaped carrier 28, for example, and participates in the movement thereof. The ring element 45 rests against the inner wall of the tool head housing 1, a sealing ring 46 being present in this region. At a distance above the ring element 45 there is an annular roof element 47, which rests against the internal surface of the tool head housing 1 and is fixedly connected with the latter. A sealing ring 48 is also present between the last-mentioned elements. The annular roof element 47, the outer wall of the tool head housing 1 and the ring element 45 form, together, a pressure chamber 8 situated on the beam entrance side; in this case, walls of ring element 45 and annular roof element 47 can overlap for the complete sealing off of the chamber 8. A sealing element 49 is then present between these walls.

FIG. 4 shows an inlet 50 for a control gas which is conducted via a channel 51 into the pressure chamber 8 situated on the beam entrance side. A further gas channel 52 (FIG. 3) is situated within the annular roof element 47 and is connected, via a channel 53, with a gas inlet 54. Within the annular roof element 47 there are passage openings 55 through which gas is blown from the gas channel 52 in the direction of the beam entrance side of the optical focusing system 2, in order to cool and to clean the latter.

The path pickup 19, which has already been mentioned in conjunction with FIGS. 1 and 2, is situated at the outer surface of the tool head housing 1 (FIG. 4) and is fixedly connected with the latter via a flange 56. A movable element 57 of the path pickup 19 is fixedly connected with a second flange 58, for example via an end-face screw 59; in this case, the second flange 58 is fixedly connected with the carrier ring 27. When the carrier ring 27 is moved in the axial direction of the tool head housing 1, the movable element 57 is correspondingly entrained via the second flange 58 and likewise moves in the axial direction of the tool head housing 1 or of the path pickup 19. As a result of the relative positions of path pickup 19 and movable element 57, an output signal corresponding to the position of the optical focusing system 2 within the tool head housing 1 may be generated, which output signal is delivered via an electrical line 20 to the already mentioned regulating unit 21.

It has already been explained in detail at the beginning that by controlling the pressure of the fluid in the pressure chambers 8 and 9 the optical focusing system 2 can be moved within the tool head housing 1 in the axial direction thereof, in order to displace the focal point of the optical focusing system 2 in the axial direction. Since the focal length of the optical focusing system 2 is, in general, known, the position of its focal point relative to the tool head housing 1 is also known if the position of the lens mounting 3 is measured by means of the path pickup 19. Thus, a system is displaced by the appropriately set pressures in the pressure chambers 8 and 9, which system consists, from bottom to top, of the following elements: of the nozzle body 37 supported by the compression spring 38, the angular ring seating 36, the lens mounting 3, the optical focusing system 2, the guide cylinder 4, the cup-shaped carrier 28, the projection 30, the adjusting screw 26, the pressure element 31, the carrier ring 27 and the ring element 45.

We claim:

1. A tool head for machining a workpiece by means of a laser beam which passes through an optical focusing system which is disposed within the tool head and which is carried by a lens mounting and which can be positioned only by displacement of the lens mounting relative to the tool head in the direction of the laser beam, wherein the lens mounting (3) is displaceable using automatic setting means (8, 9; 23) and a space is subdivided by the lens mounting (3) into two pressure chambers (8, 9) which are situated in front of and behind it in the direction of the laser beam and which can be filled in each instance with a fluid for the displacement of the lens mounting (3).

2. The tool head as claimed in claim 1, wherein the automatic setting means are pneumatic setting means.

3. The tool head as claimed in claim 1, wherein the automatic setting means are hydraulic setting means.

4. The tool head as claimed in claim 1, wherein the fluid is a liquid.

5. The tool head as claimed in claim 1, wherein the fluid is a gas.

6. The tool head as claimed in claim 5, wherein a process gas employed for the machining of the workpiece (12) can be introduced at least into the pressure chamber (9) situated on the beam exit side.

7. The tool head as claimed in claim 6, wherein the process gas can be introduced into both chambers (8, 9).

8. The tool head as claimed in claim 6, wherein a separate control gas can be introduced into the pressure chamber (8) situated on the beam entrance side.

9. The tool head as claimed in claim 8, wherein at least the pressure chamber (8) situated on the beam entrance side is connected with a pressure regulating valve (16).

10. The tool head as claimed in claim 5, wherein at least the gas situated in the pressure chamber (9) situated on the beam exit side can flow toward the beam exit side of the optical focusing system (2).

11. The tool head as claimed in claim 5, wherein the gas situated in the pressure chamber (8) situated on the beam entrance side can be guided toward the beam entrance side of the optical focusing system (2).

12. The tool head as claimed in claim 1, wherein those surfaces of the lens mounting (3) which are subjected to pressure are of differing size for the respective pressure chambers (8, 9).

13. The tool head as claimed in claims 1, wherein the lens mounting (3) can be displaced against the force of a spring (38) which is disposed on the beam exit side.

14. The tool head as claimed in claim 1, wherein a friction-reducing surface coating is present on the sealing element and/or on the opposite wall region in the region of a seal between walls which are movable relative to one another.

15. A tool head for machining a workpiece by means of a laser beam which passes through an optical focusing system (2) which is disposed within the tool head and which is carried by a lens mounting and which can be positioned only by displacement of the lens mounting relative to the tool head in the direction of the laser beam, wherein the lens mounting (3) is displaceable using automatic setting means (8, 9; 23), the automatic setting means are electrical setting means, and a protective glass (24) is disposed on the beam exit side and at a distance from the optical focusing system (2), in order to seal off the space provided for the optical focusing system (2) and the lens mounting (3) from a space (25) in which a process gas employed for the machining of the workpiece (12) is situated.

16. The tool head as claimed in claim 15, wherein a patch pickup (19) is connected to the lens mounting (3), which path pickup serves for the measurement of the position of the lens mounting (3) or of the optical focusing system (2) relative to the tool head.

17. The tool head as claimed in claim 15, wherein the lens mounting (3) is adjustable by means of an electric motor (23).

18. The tool head as claimed in claim 15, wherein the lens mounting (3) is adjustable by means of a piezoelectric drive.

19. A device for machining a workpiece by means of the tool head as claimed in claim 15, in which device the spacing between workpiece (12) and tool head (1) is measured by electrical means, having a regulating unit (21) for the positioning of the focal point of the optical focusing system (2) relative to the workpiece (12) by displacement of the lens mounting (3) as a function of the position measured by the path pickup (19) as well as the measured spacing between tool head (1) and workpiece (12).

20. The tool head as claimed in claim 1, which comprises mechanically settable abutments (34, 35) for the lens mounting (3) for the setting of theoretical positions.

21. The tool head as claimed in claim 20, which comprises arresting devices to arrest the lens mounting (3) at each one of the abutments (34, 35).

22. The tool head as claimed in claim 7, wherein a cooling gas can be guided toward the beam entrance side of the optical focusing system (2) from a gas channel (52) which is separate from the pressure chamber (8) situated on the beam entrance side.

23. The tool head as claimed in claim 1, wherein a path pickup (19) is connected to the lens mounting (3), which path pickup serves for the measurement of the position of the lens mounting (3) or of the optical focusing system (2) relative to the tool head.

24. A device for machining a workpiece by means of the tool head as claimed in claim 23, in which device the spacing between workpiece (12) and tool head (1) is measured by electrical means, having a regulating unit (21) for the positioning of the focal point of the optical focusing system (2) relative to the workpiece (12) by displacement of the lens mounting (3) as a function of the position measured by the path pickup (19) as well as of the measured spacing between tool head (1) and workpiece (12).

* * * * *